Jan. 17, 1950  C. B. WHITNEY  2,494,849
FLANGE UNION FITTING
Filed Aug. 21, 1947
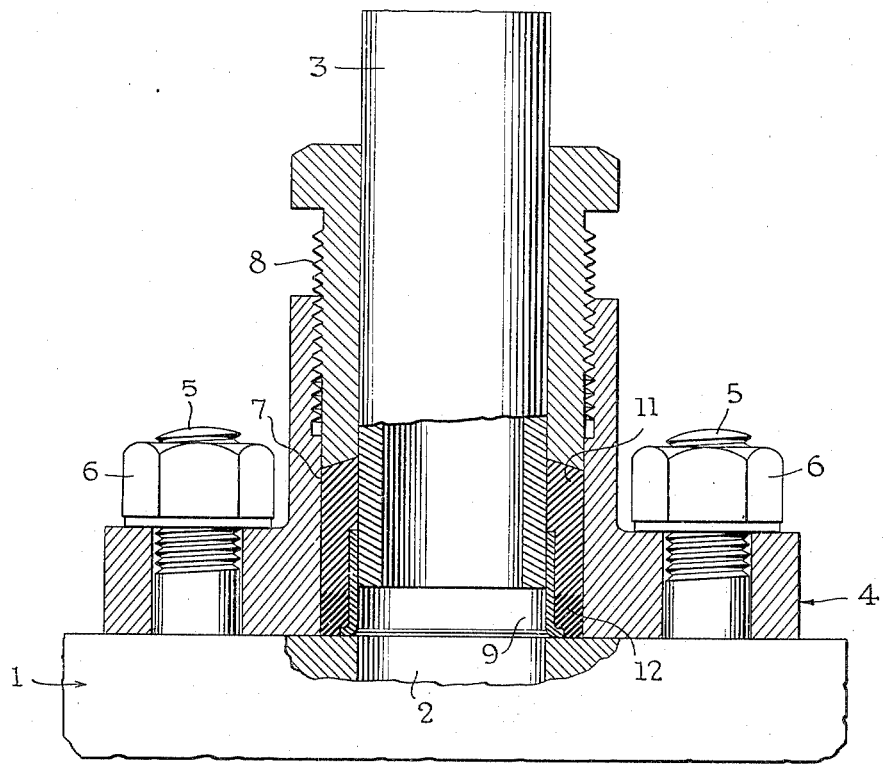
INVENTOR.
Clark Baynham Whitney
BY
ATTORNEYS.

Patented Jan. 17, 1950

2,494,849

UNITED STATES PATENT OFFICE 2,494,849

FLANGE UNION FITTING

Clark Baynham Whitney, Sackets Harbor, N. Y., assignor to The New York Air Brake Company, a corporation of New Jersey Application August 21, 1947, Serial No. 769,947

5 Claims. (Cl. 285—34)

1

This invention relates to flange union fittings such as are used to connect tubular members to ported castings, or to ported plates. Connections of this type are extensively used in the air brake art to afford releasable connections between pipes and other components of the system, such as reservoirs, pipe brackets, control valve bodies and the like.

The requirements of the service are severe because maintenance standards are high and vibration is an ever present source of trouble.

The invention will now be described by reference to the accompanying drawing in which the single figure is a view of the improved fitting, partly in section and partly in elevation In the drawing, a valve body, pipe bracket or the like, is indicated at 1 and is formed with a port 2 extending to one face of the body. The purpose of the invention is to connect a pipe 3 releasably with the port 2.

According to the invention, a fitting 4 is mounted against the flat face of the body 1 by any suitable means, here indicated as studs 5 and nuts 6, the studs passing through a flange formed on the fitting 4. The precise form of the parts so far described is not material and will vary according to the needs of particular cases.

The fitting 4 is formed with a gland 7 which is centered on the port 2 and which is larger in diameter than is the port. The outer end of this gland is closed by a gland nut 8 threaded into the fitting 4 and dimensioned to receive and laterally confine the pipe 3. The fit between the gland nut and the pipe is reasonably free, having due regard for the fact that the nut is the sole member which maintains the alinement of the pipe.

In the gland 7 there is a metallic bushing 9 which is sleeve-like in form and so dimensioned as to telescope over the end of the inserted pipe 3. One end of the bushing 9 is preferably flanged outward but in any event it seats on the body 1 around the margin of the port 2. The remainder of the gland is filled by a packing sleeve 11 which is composed of rubber or rubber-like material. One portion of the packing sleeve encircles the bushing 9 and the remainder encircles the inserted end of the pipe and is in sealing contact therewith.

The packing sleeve 11 preferably has a relatively soft or resilient end 12 which encircles the bushing 9 and which is in end contact with the face of the body 1. It is desirable for convenience in assembly, but not strictly necessary, to produce an adhesive connection between the metallic bushing 9 and the packing sleeve 11. This can

2 be accomplished by vulcanization or any other means known in the art.

It is not always necessary that the packing sleeve 11 be formed with a relatively soft end 12 but this arrangement is usually desirable. When a soft end 12 is used, it is considered important to flange the end of the bushing 9, as shown in the drawing, as the flange increases the resistance to extrusion of the packing sleeve past the end of the bushing.

In mounting the union, the fitting 4 should be first firmly connected with the body 1. After this firm connection is established, the gland nut 8 may be turned down to put the packing sleeve 11 under compression. This causes the packing sleeve to seal against a portion of the pipe and against the bushing and to enter into a peculiarly close sealing engagement with the face of the body 1, around the port 2.

Obviously, the specific forms and dimensions of the parts will be controlled in some degree by the conditions under which the fitting is used. Modifications of form and dimension within the scope of the claims is contemplated.

What is claimed is:

1. A flange union structure for connecting a tubular member with a port which terminates in the face of a body, said structure comprising in combination with said body, a fitting having a mating face which when the parts are assembled is mounted against the ported face of and connected with said body, said fitting having a gland larger than said port, extending from said mating face and adapted to aline axially therewith when the body and fitting are connected; a sleeve-like gland nut threaded into said gland and dimensioned to receive and laterally confine the end of the tubular member to be connected; a tubular metallic bushing shorter than the gland and dimensioned to telescope over the inserted end of the tubular member and to seat at one end on said body around the port therein; and a packing sleeve of rubber-like material filling said gland and in contact with said bushing through a part of its length and with said tubular member through the remainder of its length, and adapted to be forced by the gland nut into contact with said body in an annular area encircling said bushing.

2. The combination defined in claim 1, in which that end of the packing sleeve which contacts the body is softer than the opposite end portion of the packing sleeve.

3. The combination defined in claim 1, in which that end of the packing sleeve which contacts the body is softer than the opposite end portion of the packing sleeve and the metallic bushing is adhesively connected with the packing sleeve, extends the entire length of the soft portion of the packing sleeve and part way into the harder portion thereof.

4. The combination defined in claim 1, in which that end of the metallic bushing which engages the ported body is flanged outward, the flanged portion having a diameter less than the diameter of the gland.

5. The combination defined in claim 1 in which that end of the metallic bushing which engages the ported body is flanged outward, the flanged portion having a diameter less than the diameter of the gland, and the end of the packing sleeve which contacts the body and said flange is softer than the remaining portion of the packing sleeve.

CLARK BAYNHAM WHITNEY.

REFERENCES CITED

The following references are of record in the file of this patent:

UNITED STATES PATENTS

| Number | Name | Date |
|---|---|---|
| 1,013,258 | Wyton | Jan. 2, 1912 |
| 1,740,780 | Oven | Dec. 24, 1929 |
| 1,913,030 | Hux | June 6, 1933 |
| 1,958,011 | Moore | May 8, 1934 |
| 2,338,686 | Gredell | Jan. 4, 1944 |
| 2,422,597 | Stewart | June 17, 1947 |
| 2,423,122 | Stephens | July 1, 1947 |